US012508809B2

(12) United States Patent
Watanabe

(10) Patent No.: US 12,508,809 B2
(45) Date of Patent: Dec. 30, 2025

(54) LIQUID EJECTING HEAD AND LIQUID EJECTING APPARATUS

(71) Applicant: SEIKO EPSON CORPORATION, Tokyo (JP)

(72) Inventor: Eiichiro Watanabe, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 161 days.

(21) Appl. No.: 18/609,008

(22) Filed: Mar. 19, 2024

(65) Prior Publication Data

US 2024/0316929 A1 Sep. 26, 2024

(30) Foreign Application Priority Data

Mar. 20, 2023 (JP) ................................ 2023-043906
Mar. 24, 2023 (JP) ................................ 2023-047888

(51) Int. Cl.
*B41J 2/14* (2006.01)
*B41J 2/175* (2006.01)

(52) U.S. Cl.
CPC ......... *B41J 2/14233* (2013.01); *B41J 2/1433* (2013.01); *B41J 2/175* (2013.01); *B41J 2002/14491* (2013.01)

(58) Field of Classification Search
CPC ...... B41J 2/14233; B41J 2/1433; B41J 2/175; B41J 2002/14362; B41J 2002/14419; B41J 2002/14491
See application file for complete search history.

(56) References Cited

U.S. PATENT DOCUMENTS

2015/0273826 A1* 10/2015 Komatsu ............. B41J 2/14233 347/50
2019/0381794 A1* 12/2019 Watanabe .................. B41J 2/14
2021/0370673 A1* 12/2021 Okui ........................ B41J 2/155

FOREIGN PATENT DOCUMENTS

JP 2022-025894 A 2/2022

* cited by examiner

*Primary Examiner* — Anh T Vo
(74) *Attorney, Agent, or Firm* — Harness, Dickey & Pierce, P.L.C.

(57) ABSTRACT

A liquid ejecting head includes a head chip, a wiring substrate including a drive circuit, the wiring substrate being electrically coupled to the head chip, a fixing plate fixed with the head chip, a holder including an inner wall surface facing the drive circuit, the holder being made of a metal, the holder being configured to hold the head chip between the fixing plate and the holder, and a separation member disposed between the inner wall surface and the drive circuit, the separation member being configured to suppress conduction between the inner wall surface and the drive circuit.

15 Claims, 9 Drawing Sheets

LIQUID EJECTING HEAD AND LIQUID EJECTING APPARATUS

The present application is based on, and claims priority from JP Application Serial Number 2023-043906, filed Mar. 20, 2023, and JP Application Serial Number 2023-047888, filed Mar. 24, 2023, the disclosures of which are hereby incorporated by reference herein in their entirety.

BACKGROUND

1. Technical Field

The present disclosure relates to a liquid ejecting head and a liquid ejecting apparatus.

2. Related Art

In the related art, a liquid ejecting apparatus represented by an ink jet printer generally includes a liquid ejecting head that ejects liquid such as ink. For example, a liquid ejecting head described in JP-A-2022-025894 includes a plurality of head chips, a holder that holds the plurality of head chips, and a fixing plate, the plurality of head chips being interposed between the fixing plate and the holder. A flexible substrate is drawn out as a wiring substrate from the head chip, and a drive circuit that drives a drive element of the head chip is provided on the flexible substrate. In addition, each of the holder and the fixing plate is made of a metal.

In the liquid ejecting head described in JP-A-2022-025894, the drive circuit and the holder may come into contact with each other due to an assembly error. In this case, when static electricity is generated at the holder, the static electricity flows from the holder to the drive circuit, and as a result, there is a concern that the drive circuit may fail.

SUMMARY

According to an aspect of the present disclosure, there may be provided a liquid ejecting head including a first head chip including a plurality of nozzles configured to eject liquid; a first wiring substrate including a first drive circuit, the first wiring substrate being electrically coupled to the first head chip, a fixing plate including a first exposure opening portion configured to expose the plurality of nozzles of the first head chip, the fixing plate being fixed with the first head chip, a holder including a first inner wall surface facing the first drive circuit, the holder being made of a metal, the holder being configured to hold the first head chip between the fixing plate and the holder, and a separation member disposed between the first inner wall surface and the first drive circuit, the separation member being configured to suppress conduction between the first inner wall surface and the first drive circuit.

According to an aspect of the present disclosure, there may be provided a liquid ejecting apparatus including the liquid ejecting head according to the above-described aspect, and a liquid storage portion configured to supply liquid to the liquid ejecting head.

DESCRIPTION OF EMBODIMENTS

Figure 1:
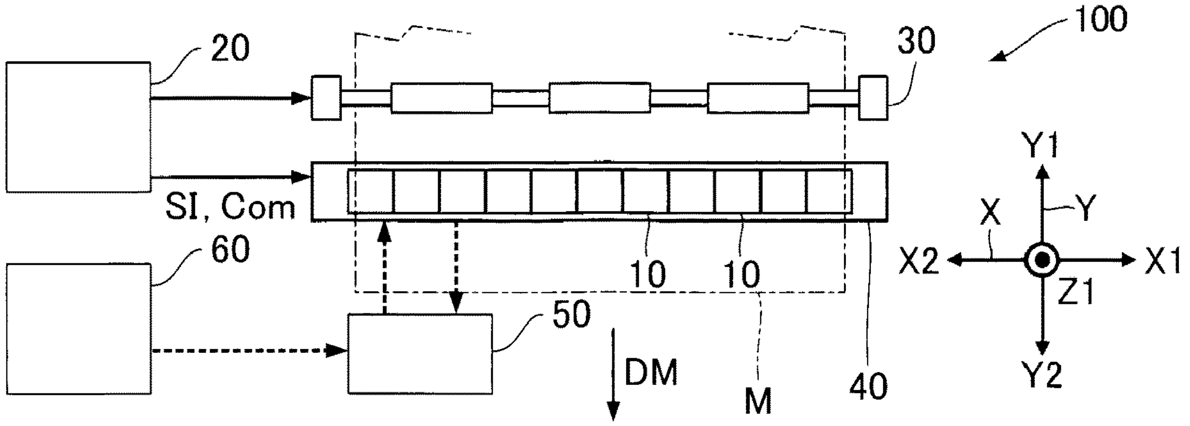
FIG. 1 is a schematic diagram illustrating a configuration example of a liquid ejecting apparatus according to a first embodiment.

Hereinafter, preferred embodiments according to the present disclosure will be described with reference to the accompanying drawings. Note that in the drawings, the size and scale of each portion or unit are appropriately different from the actual size and scale, and some portions or units are schematically illustrated to facilitate understanding. In addition, the scope of the present disclosure is not limited to these embodiments unless there is a description to the effect that the present disclosure is limited in the following description.

Hereinafter, for convenience of description, an X-axis, a Y-axis, and a Z-axis that intersect each other are appropriately used. A direction along the X-axis is referred to as an X1 direction, and a direction opposite to the X1 direction is referred to as an X2 direction. Similarly, directions opposite to each other along the Y-axis are referred to as a Y1 direction and a Y2 direction. In addition, directions opposite to each other along the Z-axis are referred to as a Z1 direction and a Z2 direction.

Here, typically, the Z-axis is a vertical axis, and the Z2 direction corresponds to a downward direction in the vertical direction. However, the Z-axis does not need to be the vertical axis and may be inclined with respect to the vertical axis. Further, the X-axis, the Y-axis, and the Z-axis are typically orthogonal to each other, but are not limited thereto. For example, the X-axis, the Y-axis, and the Z-axis may intersect with each other at an angle within a range equal to or more than 80° and equal to or less than 100°.

1. First Embodiment

1-1. Liquid Ejecting Apparatus

FIG. 1 is a schematic diagram illustrating a configuration example of a liquid ejecting apparatus 100 according to an embodiment. A liquid ejecting apparatus 100 is an ink jet printing apparatus that ejects ink as droplets onto a medium M. The ink is an example of "liquid". The liquid ejecting apparatus 100 according to the present embodiment is a so-called line type printing apparatus in which a plurality of nozzles N that eject ink are distributed over the entire range in a width direction of the medium M. The medium M is typically a printing paper sheet. Note that the medium M is not limited to the printing paper sheet, and may be a printing target made of any material such as a resin film or a fabric.

As illustrated in FIG. 1, the liquid ejecting apparatus 100 includes a liquid storage portion 60, a control unit 20, a transport mechanism 30, a liquid ejecting module 40, and a circulation mechanism 50.

The liquid storage portion 60 is a container that stores ink. Specific aspects of the liquid storage portion 60 include, for example, a cartridge that is attachable to and detachable from the liquid ejecting apparatus 100, a bag-shaped ink pack formed of a flexible film, and an ink tank that can be replenished with ink. Note that a type of ink to be stored in the liquid storage portion 60 is freely selected.

Although not illustrated, the liquid storage portion 60 according to the present embodiment includes a first liquid container and a second liquid container. The first liquid container stores first ink. The second liquid container stores second ink different from the first ink. The first ink and the second ink are, for example, inks that have different colors from each other. Note that the first ink and the second ink may be the same type of ink.

The control unit 20 controls an operation of each element of the liquid ejecting apparatus 100. Here, the control unit 20 outputs a control signal SI for controlling a discharge operation of ink in the liquid ejecting module 40 and a drive signal Com for driving the liquid ejecting module 40. The control unit 20 includes, for example, a processing circuit such as a central processing unit (CPU) or a field programmable gate array (FPGA), and a storage circuit such as a semiconductor memory. The storage circuit stores various programs and various data. The processing circuit achieves various kinds of control by executing the programs and appropriately using the data.

The transport mechanism 30 transports the medium M in a direction DM under the control of the control unit 20. The direction DM according to the present embodiment is the Y2 direction. In the example illustrated in FIG. 1, the transport mechanism 30 includes a transport roller elongated along the X-axis and a motor that rotates the transport roller. Note that the transport mechanism 30 is not limited to the configuration in which the transport roller is used, and for example, may have a configuration in which a drum or an endless belt that transports the medium M with the medium M clings to an outer circumferential surface of the drum or the endless belt by using an electrostatic force or the like is used.

The liquid ejecting module 40 ejects the ink supplied from the liquid storage portion 60 via the circulation mechanism 50 onto the medium M in the Z2 direction from each of the plurality of nozzles N under the control by the control unit 20. The liquid ejecting module 40 includes a plurality of liquid ejecting heads 10 disposed such that the plurality of nozzles N are distributed over the entire range of the medium M in the X-axis direction, and is an elongated line head extending in a direction along the X-axis. The ink is ejected from the plurality of liquid ejecting heads 10 in parallel with the transport of the medium M by using the transport mechanism 30, which forms an image on the surface of the medium M with the ink. Note that the liquid ejecting module 40 may be an elongated line head extending in the direction along the X-axis by being configured of only a single liquid ejecting head 10 in which the plurality of nozzles N are disposed in a manner as to be distributed over the entire range of the medium M in the direction in which the X-axis extends.

In the example illustrated in FIG. 1, the liquid storage portion 60 is coupled to the liquid ejecting module 40 via the circulation mechanism 50. The circulation mechanism 50 is a mechanism that supplies ink to the liquid ejecting module 40 and that collects ink discharged from the liquid ejecting module 40 for resupply of the ink to the liquid ejecting module 40. The circulation mechanism 50 includes, for example, a sub tank that stores the ink, a supply flow path configured to supply the ink from the sub tank to the liquid ejecting module 40, a collection flow path configured to collect the ink from the liquid ejecting module to the sub tank, and a pump configured to transport the ink. These are provided for each of the first ink and the second ink described above. The operations of the circulation mechanism 50 described above make it possible to suppress an increase in viscosity of the ink and to reduce retention of air bubbles in the ink.

As described above, the liquid ejecting apparatus 100 includes the liquid ejecting heads 10 and the liquid storage portion 60 configured to supply the liquid to the liquid ejecting heads 10. Such a liquid ejecting apparatus 100 is excellent in reliability because a failure of a drive circuit 17 in the liquid ejecting head 10 is suppressed as will be described later.

1-2. Liquid Ejecting Module

Figure 2:
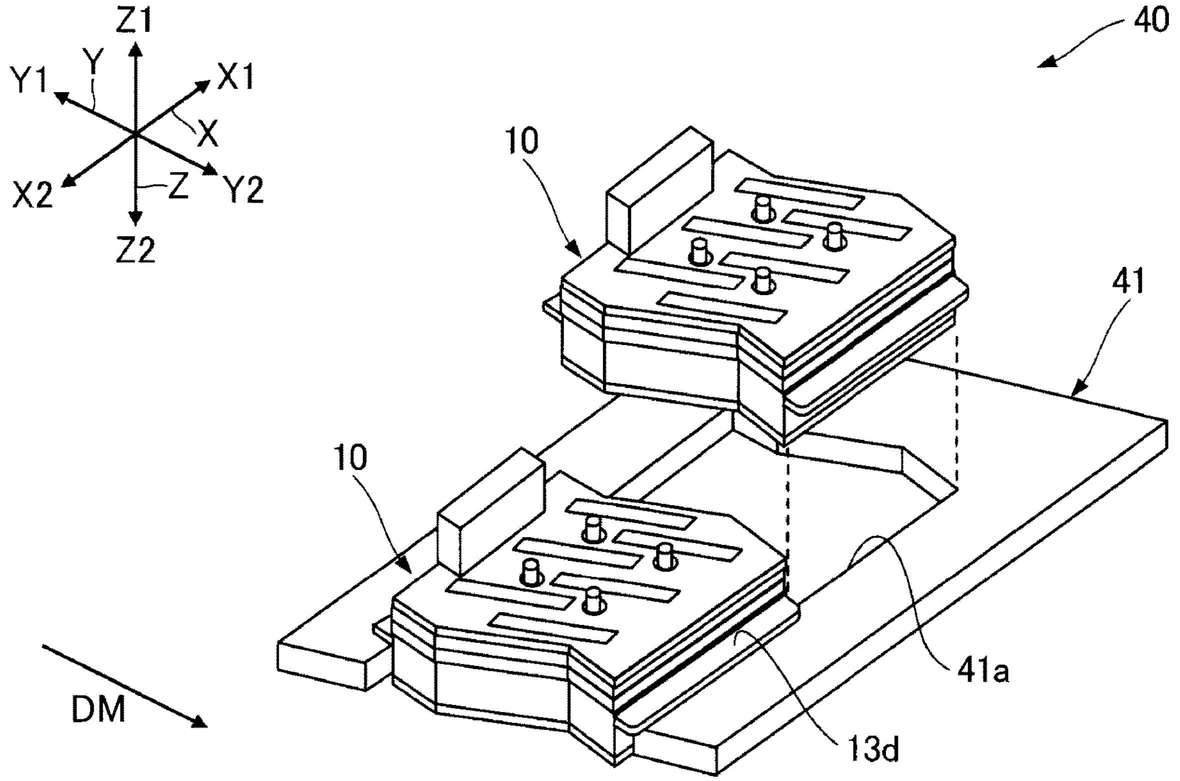
FIG. 2 is a perspective view of a liquid ejecting module including liquid ejecting heads according to the first embodiment.

FIG. 2 is a perspective view of the liquid ejecting module 40 including the liquid ejecting heads 10 according to the embodiment. As illustrated in FIG. 2, the liquid ejecting module 40 includes a support body 41 and a plurality of liquid ejecting heads 10.

The support body 41 is a member that supports the plurality of liquid ejecting heads 10. In the example illustrated in FIG. 2, the support body 41 is a plate-shaped member made of a metal or the like, and is provided with an attachment hole 41*a* configured to be attached with the plurality of liquid ejecting heads 10. The plurality of liquid ejecting heads 10 are inserted into the attachment hole 41*a* in a manner to be aligned in the direction along the X-axis, and each liquid ejecting head 10 is fixed to the support body 41 by screwing or the like. In FIG. 2, two liquid ejecting heads 10 are representatively illustrated. Note that the number of liquid ejecting heads 10 in the liquid ejecting module 40 is freely selected. Further, a shape and the like of the support body 41 are not limited to the example illustrated in FIG. 2, and are freely selected.

1-3. Liquid Ejecting Head

Figure 3:
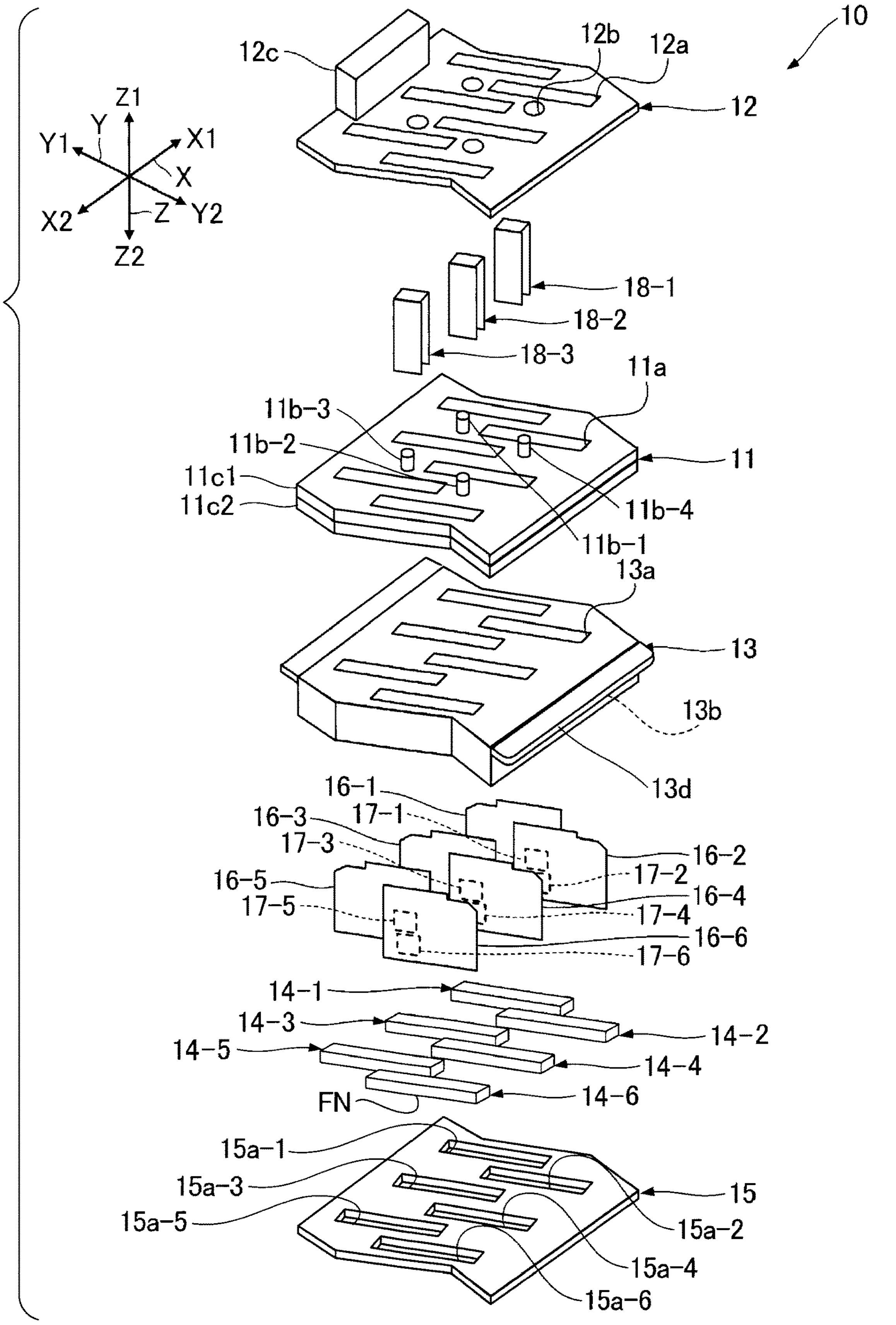
FIG. 3 is an exploded perspective view of the liquid ejecting head illustrated in FIG. 2.

FIG. 3 is an exploded perspective view of the liquid ejecting head 10 illustrated in FIG. 2. As illustrated in FIG. 3, the liquid ejecting head 10 includes a flow path member 11, a circuit substrate 12, a holder 13, head chips 14-1 to 14-6, a fixing plate 15, wiring substrates 16-1 to 16-6, drive circuits 17-1 to 17-6, and separation members 18-1 to 18-3.

The head chip 14-1 is an example of a "first head chip", and the head chip 14-2 is an example of a "second head chip". The wiring substrate 16-1 is an example of a "first wiring substrate", and the wiring substrate 16-2 is an example of a "second wiring substrate". The drive circuit 17-1 is an example of a "first drive circuit", and the drive circuit 17-2 is an example of a "second drive circuit". Hereinafter, the head chips 14-1 to 14-6 may be referred to as the head chip 14 without distinction, the wiring substrates 16-1 to 16-6 may be referred to as the wiring substrate 16 without distinction, the drive circuits 17-1 to 17-6 may be referred to as the drive circuit 17 without distinction, and the separation members 18-1 to 18-3 may be referred to as the separation member 18 without distinction.

The circuit substrate 12, the flow path member 11, the holder 13, the plurality of head chips 14-1 to 14-6, and the fixing plate 15 are layered in this order in the Z2 direction, and are joined to each other by using an adhesive, screwing, or the like. Here, the wiring substrate 16 is drawn out from each head chip 14, and the wiring substrate 16 is coupled to the circuit substrate 12 through a wiring hole 13*a*, which will be described later, of the holder 13 and a wiring hole 11*a*, which will be described later, of the flow path member 11. Each wiring substrate 16 is provided with the drive circuit 17. The separation member 18 is inserted into the wiring hole 13*a*, which will be described later, of the holder 13 and the wiring hole 11*a*, which will be described later, of the flow path member 11 from between the flow path member 11 and the circuit substrate 12, and blocks conduction between the drive circuit 17 and the holder 13. Hereinafter, each portion of the liquid ejecting head 10 will be sequentially and briefly described with reference to FIG. 3.

The flow path member 11 is a structure inside which a flow path configured to cause ink to flow between the circulation mechanism 50 and the plurality of head chips 14 is provided. As illustrated in FIG. 3, the flow path member 11 is provided with a plurality of wiring holes 11*a* and a plurality of coupling pipes 11*b*-1 to 11*b*-4. Additionally, although illustration is omitted in FIG. 3, the flow path member 11 is provided with a supply flow path configured to supply the first ink to the plurality of head chips 14, a supply flow path configured to supply the second ink to the plurality of head chips 14, a discharge flow path configured to discharge the first ink from the plurality of head chips 14, and a discharge flow path configured to discharge the second ink from the plurality of head chips 14. Note that hereinafter, the coupling pipes 11*b*-1 to 11*b*-4 may be referred to as the coupling pipe 11*b* without being distinguished from each other.

The flow path member 11 includes layers 11*c*1 and 11*c*2, which are layered in this order in the Z2 direction. Grooves, holes, or the like are appropriately provided at these layers, which constitute flow paths such as the supply flow path and the discharge flow path described above. The layers 11*c*1 and 11*c*2 are made of, for example, a resin material and are formed by injection-molding. The layer 11*cl* and the layer 11*c*2 are bonded to each other by using, for example, an adhesive. Note that aspects such as thicknesses and the number of layers constituting the flow path member 11 are not limited to the example illustrated in FIG. 3, and are freely selected.

Each of the plurality of wiring holes 11*a* is a hole through which the wiring substrate 16 passes, and penetrates the flow path member 11 in a direction along the Z-axis. In the example illustrated in FIG. 3, the wiring hole 11*a* is provided for each head chip 14, and each wiring hole 11*a* is used for passing not only the wiring substrate 16 but also the separation member 18 therethrough. Each of the coupling pipes 11*b*-1 to 11*b*-4 protrudes from the layer 11*c*1 in the Z1 direction. The coupling pipe 11*b*-1 is a pipe body constituting a flow path configured to introduce the first ink into the flow path member 11. In addition, the coupling pipe 11*b*-2 is a pipe body constituting a flow path configured to introduce the second ink to the flow path member 11. On the other hand, the coupling pipe 11*b*-3 is a pipe body constituting a flow path configured to discharge the first ink from the flow path member 11. In addition, the coupling pipe 11*b*-4 is a pipe body constituting a flow path configured to discharge the second ink from the flow path member 11.

The circuit substrate 12 is a mounting component configured to electrically couple the control unit 20 and the wiring substrate 16. The circuit substrate 12 is, for example, a rigid wiring substrate. A coupler 12*c* is installed on a surface of the circuit substrate 12 facing the Z1 direction. The coupler 12*c* is a coupling component configured to perform electrical coupling with the control unit 20. Further, the circuit substrate 12 is provided with a plurality of wiring holes 12*a* and a plurality of holes 12*b*. Each wiring hole 12*a* is a hole configured to pass the wiring substrate 16 therethrough. A terminal, which is not illustrated, to be coupled to the wiring substrate 16 through the wiring hole 12*a* is provided on the surface of the circuit substrate 12 facing the Z1 direction. In the example illustrated in FIG. 3, the wiring hole 12*a* is provided for each head chip 14. Each hole 12*b* is a hole through which the above-described coupling pipe 11*b* passes. The coupling pipe 11*b* passing through the hole 12*b* protrudes in the Z1 direction from the circuit substrate 12.

The holder 13 is a structure that accommodates and supports the plurality of head chips 14. The holder 13 is made of a metal such as stainless steel, Invar, or 42 alloy. The holder 13 is made of a metal, which enhances rigidity of the holder 13 and suppresses linear expansion and swelling of the holder 13. Thus, the holder 13 is less likely to be deformed. As a result, the occurrence of misalignment of the plurality of head chips 14 due to deformation of the holder 13 can be reduced. The holder 13 has a plate shape expanding in a direction perpendicular to the Z-axis. The holder 13 is provided with a plurality of wiring holes 13*a* and a recessed portion 13*b*. Each wiring hole 13*a* is a hole configured to pass the wiring substrate 16 therethrough. In the example illustrated in FIG. 3, the wiring hole 13*a* is provided for each head chip 14, and each wiring hole 13*a* is used for passing not only the wiring substrate 16 but also the separation member 18 therethrough, and permits coupling between the flow path member 11 and each head chip 14. The recessed portion 13*b* is provided on a surface facing the Z2 direction of the holder 13 and accommodates the plurality of head chips 14. As described above, the holder 13 is made of a metal and holds the head chips 14-1 to 14-6 between the holder 13 and the fixing plate 15. Further, the holder 13 includes flange portions 13*d* protruding in the Y1 direction and the Y2 direction. Although not illustrated, the liquid ejecting head 10 and the support body 41 may be positioned by inserting or press-fitting a positioning pin provided at the support body 41 into a positioning hole provided in the flange portion 13*d*. The holder 13 is preferably made of a metal material so that positioning accuracy may also be improved. Further, as compared with the case where the holder 13 is made of a resin, constituting the holder 13 of a metal improves dimensional accuracy.

Each of the head chips 14 ejects ink. Specifically, although not illustrated in FIG. 3, each of the head chips 14 includes a plurality of nozzles N that eject the first ink and a plurality of nozzles N that eject the second ink. These nozzles N are provided on a nozzle surface FN that is a surface of each head chip 14 facing the Z2 direction. The configuration of the head chip 14 will be described later. Note that a plan view viewed in a direction perpendicular to the nozzle surface FN is simply referred to as "a plan view".

The fixing plate 15 is a plate member to which the plurality of head chips 14 are fixed. The fixing plate 15 is disposed with the plurality of head chips 14 interposed between the fixing plate 15 and the holder 13, and is fixed to the holder 13 by using an adhesive. The fixing plate 15 is preferably made of, for example, a metal material such as stainless steel. Making the fixing plate 15 by using a metal causes the fixing plate 15 to be made thin, which can shorten a distance between the nozzle surface FN of the head chip 14 and the medium M, and can improve impact accuracy of ink ejected onto the medium M from the nozzles N. In addition, since the fixing plate 15 is made of a metal, a liquid repellent film is easily formed on a surface of the fixing plate 15 facing the Z2 direction same as the direction that the nozzle surface FN faces, and ink resistance can be improved. Furthermore, making the fixing plate 15 by using a metal can improve planarity and flatness of the fixing plate 15, and thus alignment accuracy can be improved when the plurality of head chips 14 are aligned on a surface of the fixing plate 15 facing the Z1 direction. Note that the material of which the fixing plate 15 is made is not limited to a metal and may be, for example, a resin or the like.

The fixing plate 15 is provided with exposure opening portions 15*a*-1 to 15*a*-6 that expose the plurality of nozzles N, which will be described later, of the head chips 14-1 to 14-6. The exposure opening portions 15*a*-1 to 15*a*-6 correspond to the head chips 14-1 to 14-6 on a one to one basis. The exposure opening portion 15*a*-1 is an example of a "first exposure opening portion", and the exposure opening portion 15*a*-2 is an example of a "second exposure opening portion". As described above, the fixing plate 15 includes the exposure opening portions 15*a*-1 to 15*a*-6 that expose the plurality of nozzles N, which will be described later, of the head chips 14-1 to 14-6, and the head chips 14-1 to 14-6 are fixed to the fixing plate 15.

The wiring substrate 16 is a flexible substrate including wiring lines to be electrically coupled to piezoelectric elements 14*f*, which will be described later, and is, for example, flexible printed circuits (FPC), a chip on film (COF), or the like. The drive circuit 17 is provided on one surface of the wiring substrate 16. As described above, the wiring substrate 16 includes the drive circuit 17 and is electrically coupled to the head chip 14. That is, the wiring substrate 16-1 includes the drive circuit 17-1 and is electrically coupled to the head chip 14-1. The wiring substrate 16-2 includes the drive circuit 17-2 and is electrically coupled to the head chip 14-2. Similarly, the wiring substrates 16-3 to 16-6 include the drive circuits 17-3 to 17-6, and are electrically coupled to the head chips 14-3 to 14-6, respectively.

The drive circuit 17 is a circuit that includes a plurality of switching elements corresponding to, on a one to one basis, a plurality of piezoelectric elements 14*f* corresponding to the plurality of nozzles N, which will be described later, and that selects whether or not to supply the drive signal Com to each piezoelectric element 14*f*.

The separation member 18 is a member disposed between the drive circuit 17 and the holder 13 and configured to block conduction between the drive circuit 17 and the holder 13. In the example illustrated in FIG. 3, the separation member 18 is a structure obtained by folding a sheet-shaped or film-shaped member. Note that the details of the separation member 18 will be described later with reference to FIG. 7 to FIG. 9.

1-4. Head Chip

Figure 4:
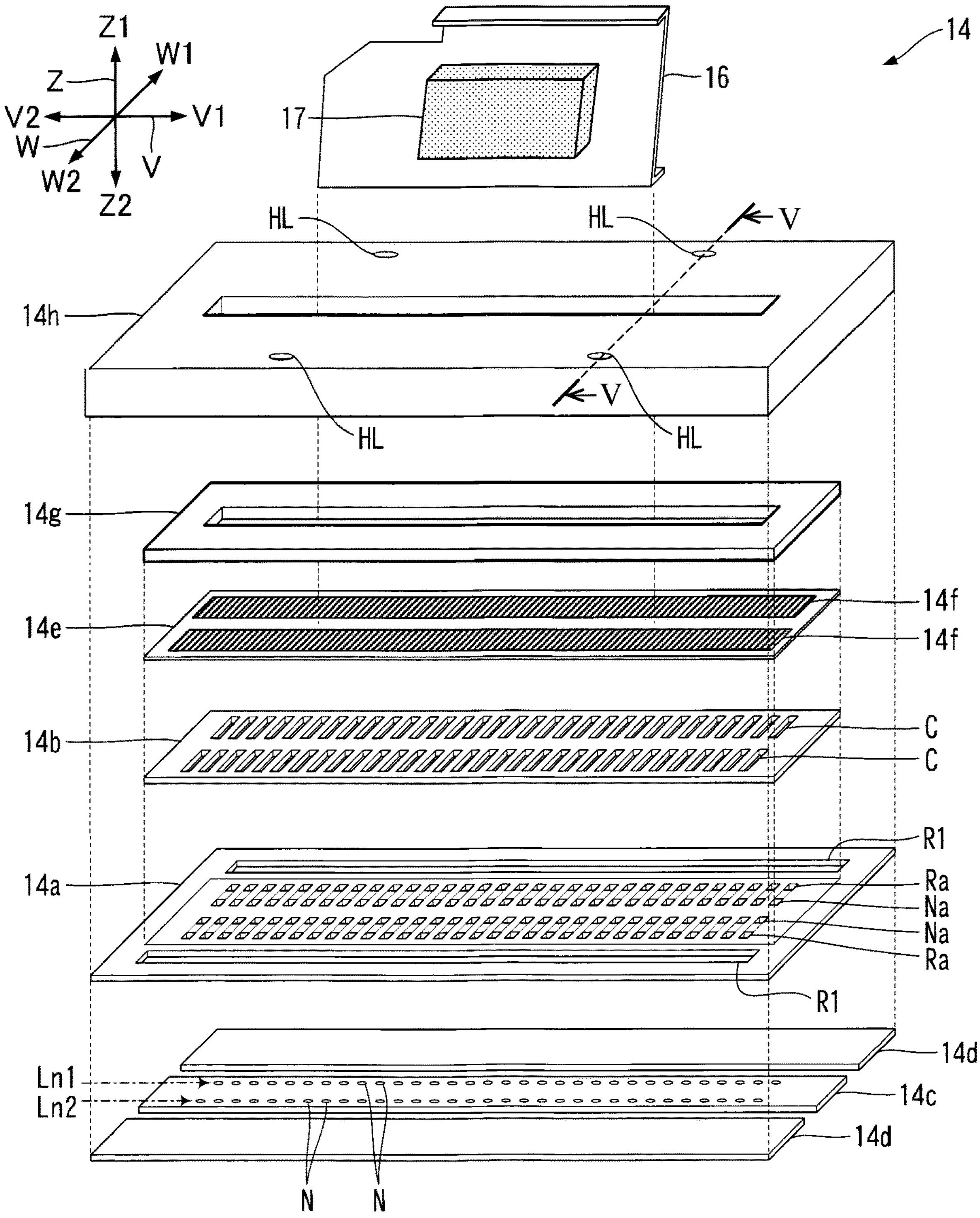
FIG. 4 is an exploded perspective view of a head chip of the liquid ejecting head.
Figure 5:
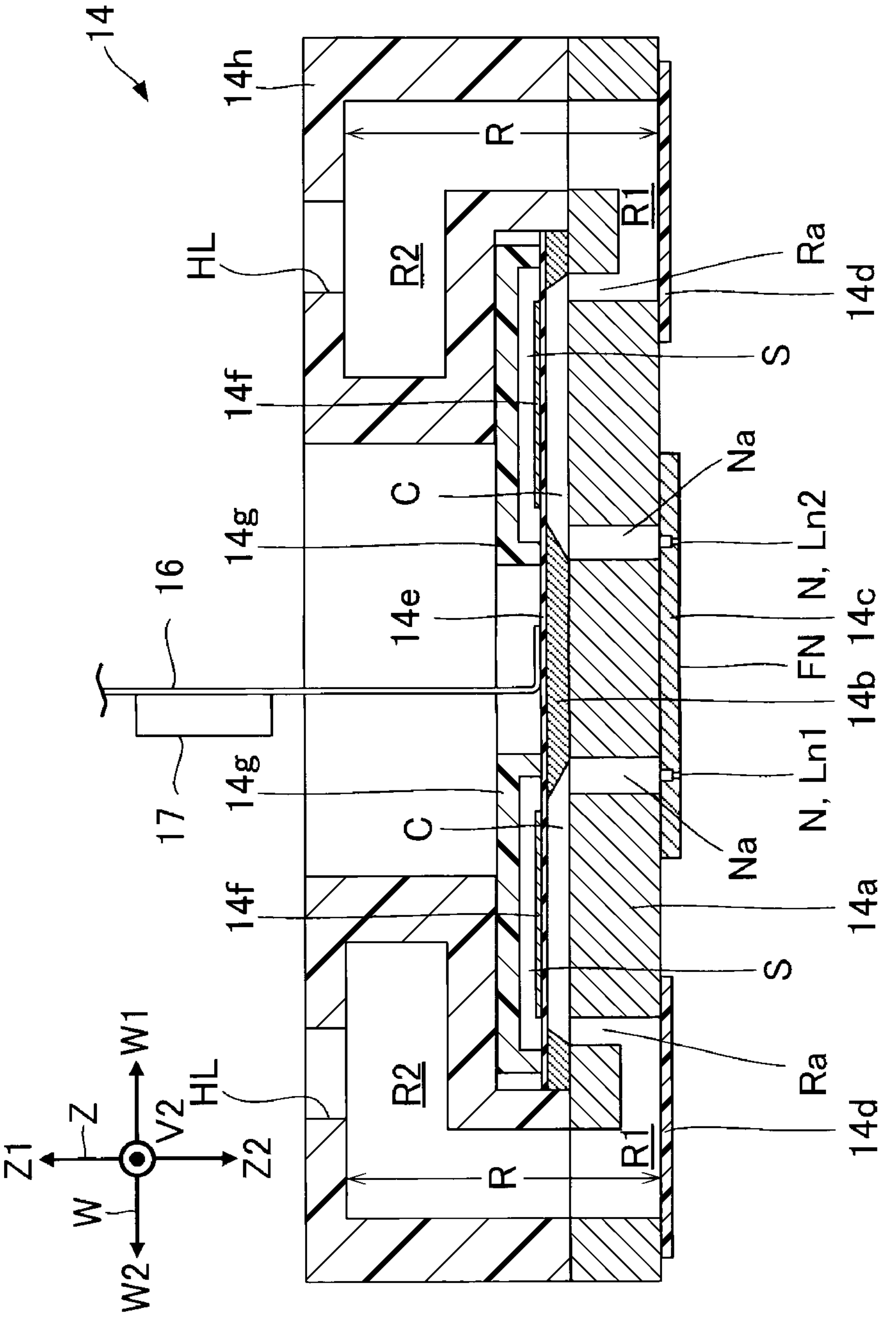
FIG. 5 is a cross-sectional view taken along a line V-V in FIG. 4.

FIG. 4 is an exploded perspective view of the head chip 14 of the liquid ejecting head 10. FIG. 5 is a cross-sectional view taken along a line V-V in FIG. 4. Hereinafter, for convenience of description, a V-axis and a W-axis intersecting with the Z-axis and intersecting with each other will be appropriately used. One direction along the V-axis is referred to as a V1 direction, and a direction opposite to the V1 direction is referred to as a V2 direction. Similarly, directions opposite to each other along the W-axis are referred to as a W1 direction and a W2 direction. Here, the V-axis is an axis parallel to a direction DN in which nozzle rows Ln1 and Ln2, which will be described later, extend, and extends in a direction inclined with respect to the Y-axis. The W-axis extends in a direction inclined with respect to the X-axis. Note that the V-axis and the W-axis are typically orthogonal to each other, but the present disclosure is not limited thereto. The V-axis and the W-axis may intersect with each other at an angle within a range being equal to or more than 80° and equal to or less than 100°, for example.

As illustrated in FIG. 4 and FIG. 5, the head chip 14 includes the plurality of nozzles N arrayed in a direction along the V-axis.

The plurality of nozzles N included in the head chip 14 are divided into the nozzle row Ln1 and the nozzle row Ln2 that are aligned at an interval from each other in a direction along the W-axis. Each of the nozzle row Ln1 and the nozzle row Ln2 is a set of a plurality of nozzles N linearly arrayed in a direction along the V-axis.

The head chip 14 is substantially symmetrical to each other in the direction along the W-axis. However, positions of the plurality of nozzles N in the nozzle row Ln1 and the plurality of nozzles N in the nozzle row Ln2 in the direction along the V-axis may coincide with each other or may be different from each other. FIG. 4 and FIG. 5 illustrate, as an example, a configuration in which the positions of the plurality of nozzles N in the nozzle row Ln1 and the plurality of nozzles N in the nozzle row Ln2 in the direction along the V-axis coincide with each other.

As illustrated in FIG. 4 and FIG. 5, the head chip 14 includes a flow path substrate 14*a*, a pressure chamber substrate 14*b*, a nozzle plate 14*c*, a vibration absorber 14*d*, a vibrating plate 14*e*, the plurality of piezoelectric elements 14*f*, a cover 14*g*, and a case 14*h*.

The flow path substrate 14*a* and the pressure chamber substrate 14*b* are layered in this order in the Z1 direction, and form a flow path configured to supply ink to the plurality of nozzles N. The vibrating plate 14*e*, the plurality of piezoelectric elements 14*f*, the cover 14*g*, and the case 14*h* are installed in a region positioned in the Z1 direction from the layered body including the flow path substrate 14*a* and the pressure chamber substrate 14*b*. On the other hand, the nozzle plate 14*c* and the vibration absorber 14*d* are provided in a region positioned in the Z2 direction from the layered body. Each element of the head chip 14 is schematically a plate-shaped member elongated in the V direction, and the elements are bonded to each other by using, for example, an adhesive. Hereinafter, each element of the head chip 14 will be described in order.

The nozzle plate 14*c* is a plate-shaped member in which the plurality of nozzles N in each of the nozzle row Ln1 and the nozzle row Ln2 are provided. Each of the plurality of nozzles N is a through hole through which ink passes. Here, the surface of the nozzle plate 14*c* facing the Z2 direction is the nozzle surface FN. The nozzle plate 14*c* is manufactured, for example, by processing a silicon single crystal substrate by using a semiconductor manufacturing technique using a processing technique such as dry etching or wet etching. However, other known methods and materials may be suitably used for manufacturing the nozzle plate 14*c*. Further, the shape of the nozzle N is not limited to the example illustrated in the drawings, and is freely selected.

In the flow path substrate 14*a*, a first flow path R1, a plurality of supply flow paths Ra, and a plurality of communication flow paths Na are provided for each of the nozzle row Ln1 and the nozzle row Ln2. The first flow path R1 is a flow path that communicates with the nozzles N and that is upstream from the nozzles N, and is constituted by a hole that has an elongated shape and that extends in the direction along the V-axis in plan view viewed in the direction along the Z-axis. Each of the supply flow paths Ra and the communication flow paths Na is a through hole formed for each nozzle N. Each supply flow path Ra communicates with the first flow path R1.

The pressure chamber substrate **14*b* is a plate-shaped member in which a plurality of pressure chambers C are provided for each of the nozzle row Ln1 and the nozzle row Ln2**. The plurality of pressure chambers C are arrayed in the direction along the V-axis. Each pressure chamber C is formed for each nozzle N, and is a space that has an elongated shape and that extends in the direction along the W-axis in plan view.

Each of the flow path substrate **14*a* and the pressure chamber substrate 14*b* is manufactured, for example, by processing a silicon single crystal substrate by a semiconductor manufacturing technique, same as the nozzle plate 14*c* described above. However, other known methods and materials may be appropriately used for manufacturing each of the flow path substrate 14*a* and the pressure chamber substrate 14*b***.

The pressure chamber C is positioned between the flow path substrate **14*a* and the vibrating plate 14*e*. For each of the nozzle row Ln1 and the nozzle row Ln2, the plurality of pressure chambers C are arrayed in the direction along the V-axis. In addition, the pressure chamber C communicates with both the communication flow path Na and the supply flow path Ra. Thus, the pressure chamber C communicates with the nozzle N through the communication flow path Na and communicates with the first flow path R1** through the supply flow path Ra.

The vibrating plate **14*e* is disposed on a surface of the pressure chamber substrate 14*b* facing the Z1 direction. The vibrating plate 14*e* is a plate-shaped member that can elastically vibrate. Although not illustrated, the vibrating plate 14*e* includes, for example, an elastic film and an insulating film, which are layered in this order in the Z1** direction. The elastic film is made of, for example, silicon oxide ($SiO_2$) and is formed by thermally oxidizing one surface of a silicon single crystal substrate. The insulating film is made of, for example, zirconium oxide ($ZrO_2$) and is formed by forming a layer of zirconium by a sputtering method and thermally oxidizing the layer.

Note that the configuration of the vibrating plate **14*e* is not limited to the above-described configuration in which the elastic film and the insulating film are layered, and the vibrating plate 14*e* may be formed of, for example, a single layer or three or more layers. In addition, the material of each layer constituting the vibrating plate 14*e*** is not limited to the material described above, and may be, for example, silicon, silicon nitride, or the like.

On the surface of the vibrating plate **14*e* facing the Z1 direction, the plurality of piezoelectric elements 14*f* corresponding to the nozzles N are disposed as drive elements for each of the nozzle row Ln1 and the nozzle row Ln2, and one end of the wiring substrate 16 is coupled to the surface. Each piezoelectric element 14*f* is a passive device that deforms when a potential corresponding to the drive signal Com is supplied through the wiring substrate 16, and generates pressure fluctuation of ink in the pressure chamber C. Each piezoelectric element 14*f* has an elongated shape extending in the direction along the W-axis in plan view. The plurality of piezoelectric elements 14*f* are arrayed in the direction along the V-axis in such a manner as to correspond to the plurality of pressure chambers C. The piezoelectric element 14*f*** overlaps the pressure chamber C in plan view.

Although not illustrated, each piezoelectric element **14*f* has a first electrode, a piezoelectric body, and a second electrode, which are layered in this order in the Z1 direction. The first electrode is an individual electrode for each of the piezoelectric elements 14*f*. The first electrodes are disposed in a separated manner from each other. A potential corresponding to the drive signal Com is supplied to the first electrode. The second electrode is a common electrode that has a band shape and that extends in the direction along the V-axis in such a manner as to be continuous over the plurality of piezoelectric elements 14*f*. For example, a constant potential is supplied to the second electrode. Examples of metal materials of these electrodes include metal materials such as platinum (Pt), aluminum (Al), nickel (Ni), gold (Au), and copper (Cu), and among these, one type can be used alone, or two or more types can be used in combination in the form of an alloy, a laminate, or the like. The piezoelectric body is made of a piezoelectric material such as lead zirconate titanate ($Pb(Zr,Ti)O_3$). In the above-described piezoelectric element 14*f*, when a voltage is applied between the first electrode and second electrode, the piezoelectric body deforms due to inverse piezoelectric effect. When the vibrating plate 14*e* vibrates along with this deformation, the pressure in the pressure chamber C fluctuates, and the ink is ejected from the nozzle N. Note that, instead of the piezoelectric elements 14*f***, heating elements that cause ink to be ejected from the nozzles N by bubbles generated by making the ink to generate heat in the pressure chambers C may be used as the drive elements.

The cover **14*g* is a plate-shaped member installed on the surface of the vibrating plate 14*e* facing the Z1 direction. The cover 14*g* protects the plurality of piezoelectric elements 14*f* and reinforces mechanical strength of the vibrating plate 14*e*. Here, the plurality of piezoelectric elements 14*f* are accommodated in a space S between the cover 14*g* and the vibrating plate 14*e*. The cover 14*g*** is made of, for example, a resin material.

The case **14*h* is a case configured to store ink to be supplied to the plurality of pressure chambers C. The case 14*h* is made of, for example, a resin material. The case 14*h* is provided with a second flow path R2 for each of the nozzle row Ln1 and the nozzle row Ln2. The second flow path R2 is a space coupled to the first flow path R1 described above, and is constituted by a hole that has an elongated shape and that extends in the direction along the V-axis in plan view viewed in the direction along the Z-axis. The second flow path R2 communicates with the nozzles N and functions as a reservoir R that stores ink to be supplied to the plurality of pressure chambers C, together with the first flow path R1. Two openings HL are provided for each reservoir R at the case 14*h*. Of the two openings HL, one opening HL is an introduction port configured to supply the ink to the reservoir R, and the other opening HL is a discharge port configured to discharge the ink from the reservoir R. The ink in the reservoirs R is supplied to the pressure chambers C through the corresponding supply flow paths Ra. Note that aspects such as positions and the number of the openings HL for each reservoir R are not limited to the example of FIG. 4 and FIG. 5**, and are freely selected.

The vibration absorber **14*d* is also referred to as a compliance substrate. The vibration absorber 14*d* is a flexible resin film constituting a wall surface of the reservoir R. The vibration absorber 14*d* absorbs the pressure fluctuation of the ink in the reservoir R. Note that the vibration absorber 14*d* may be a thin plate made of a metal and having flexibility. A surface of the vibration absorber 14*d* facing the Z1 direction is bonded to the flow path substrate 14*a*** by using an adhesive or the like.

1-5. Separation Member

Figure 6:
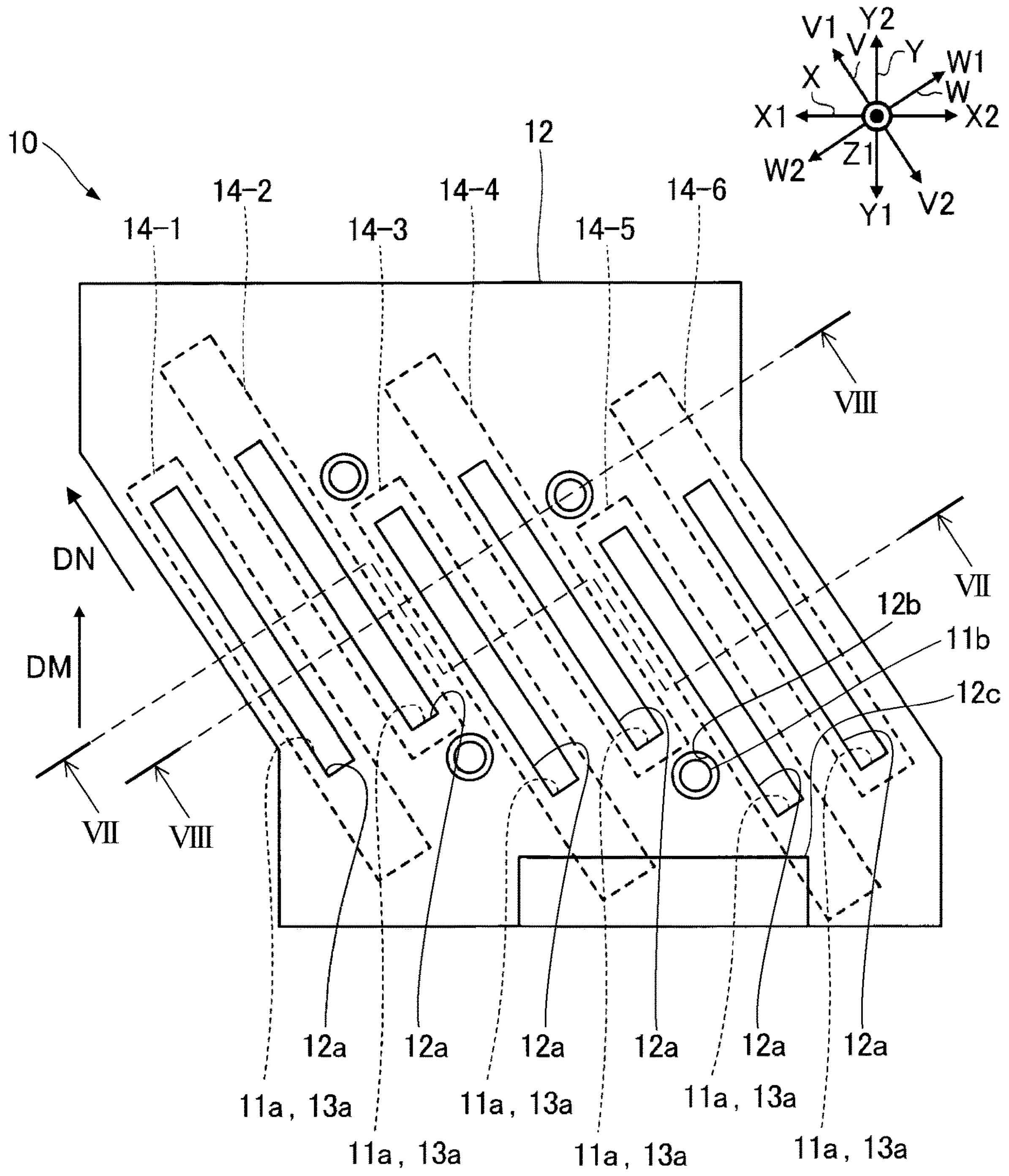
FIG. 6 is a plan view of the liquid ejecting head according to the first embodiment.
Figure 7:
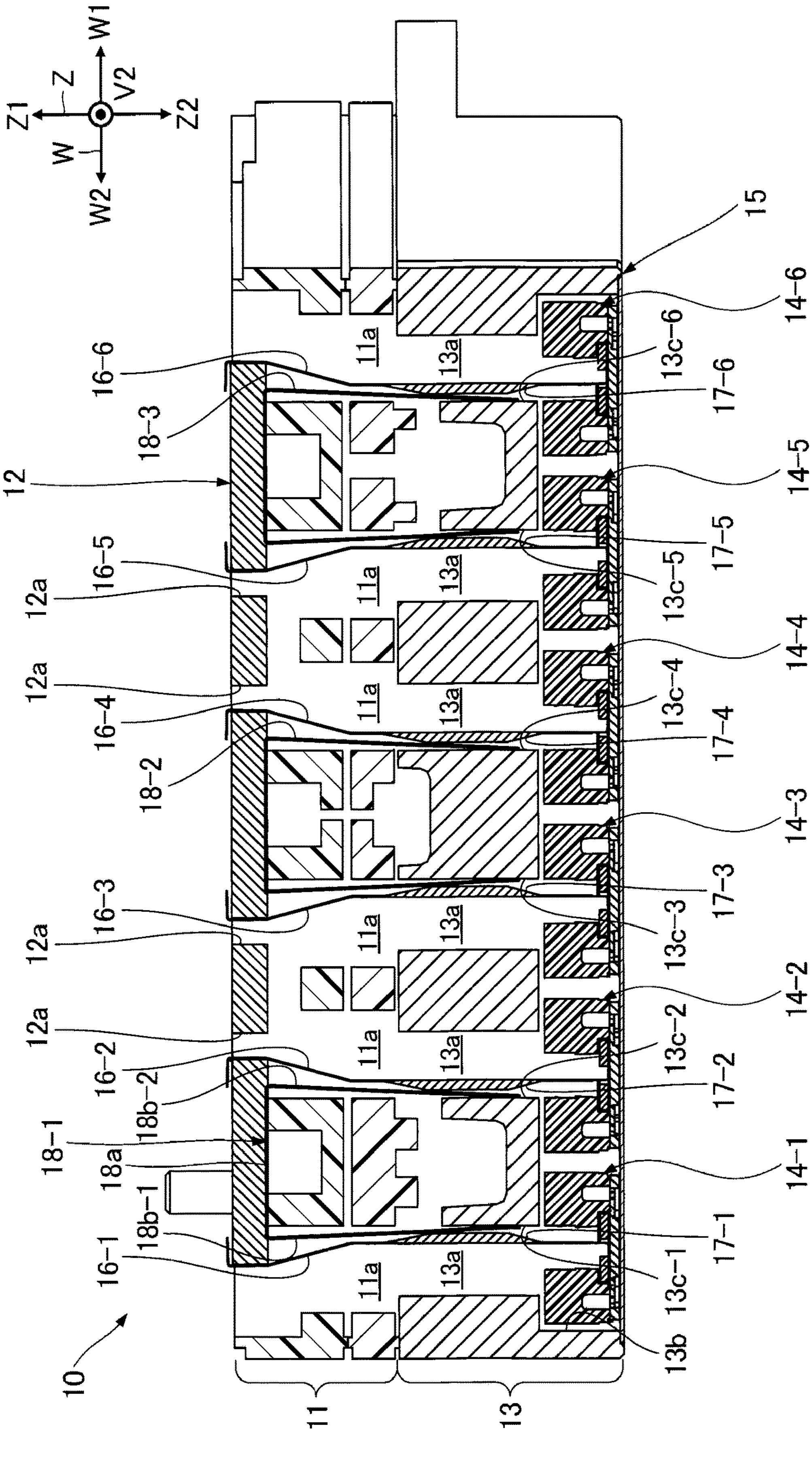
FIG. 7 is a cross-sectional view taken along a line VII-VII in FIG. 6.
Figure 8:
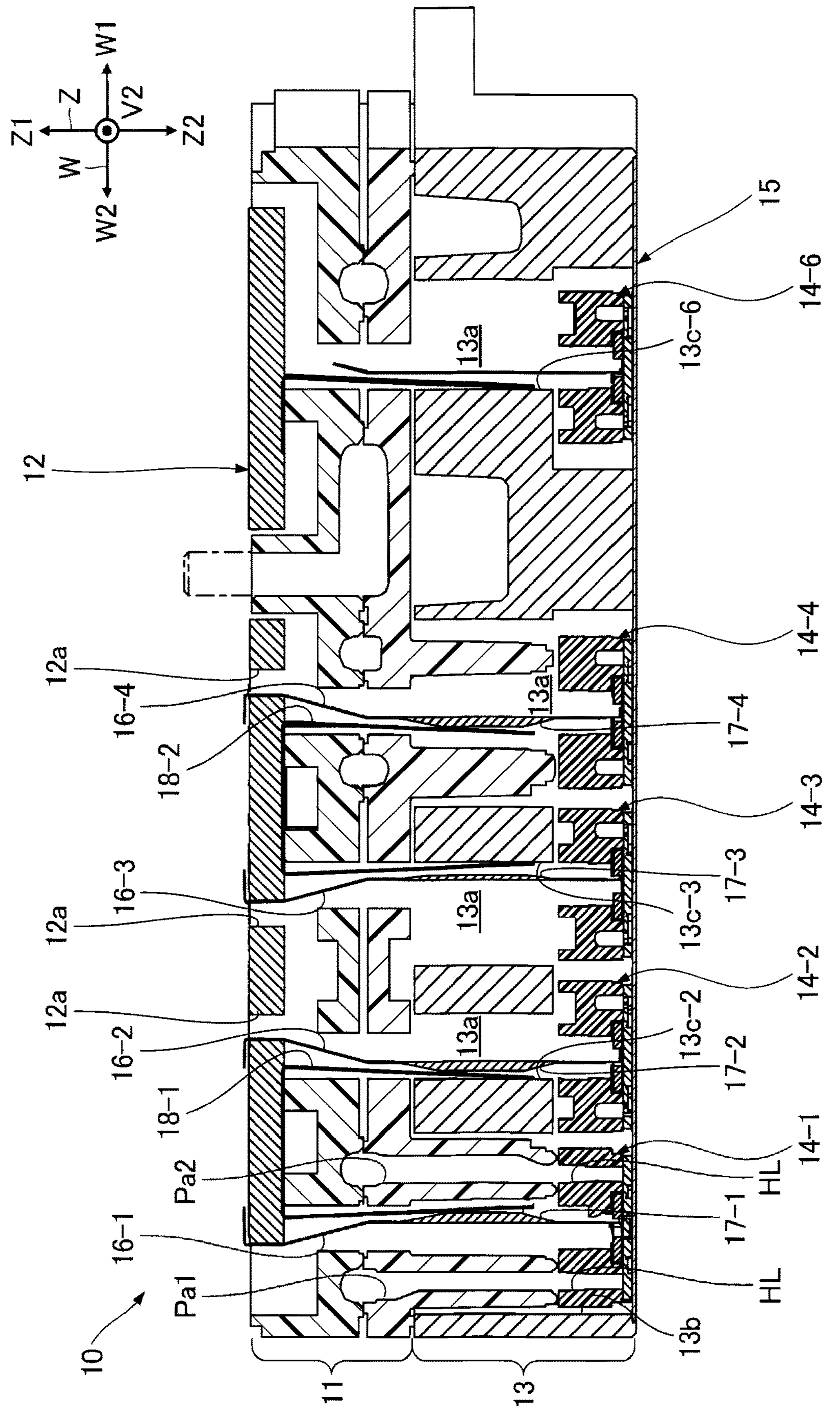
FIG. 8 is a cross-sectional view taken along a line VIII-VIII in FIG. 6.
Figure 9:
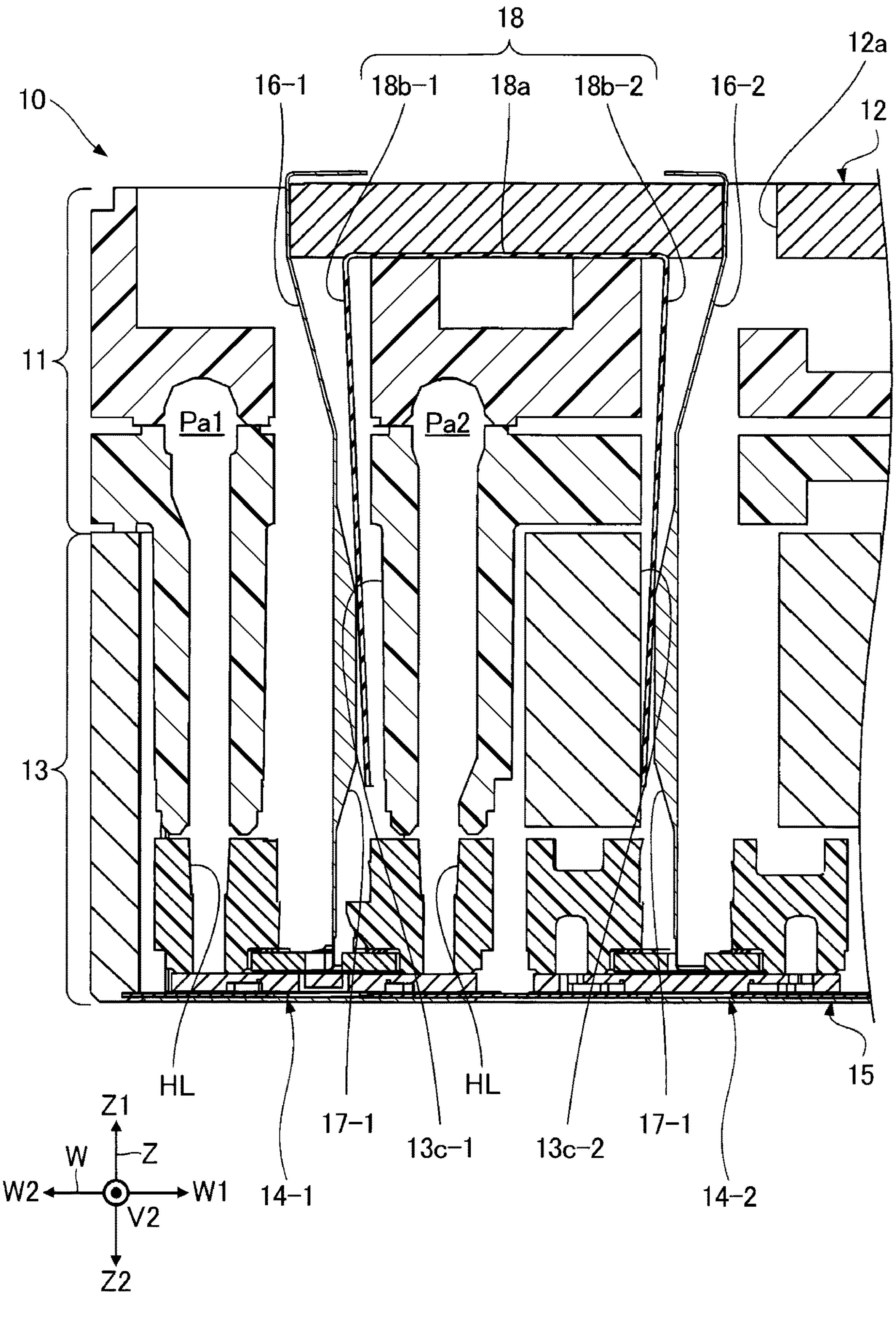
FIG. 9 is an enlarged cross-sectional view illustrating a part of the liquid ejecting head according to the first embodiment.

FIG. 6 is a plan view of the liquid ejecting head 10. FIG. 7 is a cross-sectional view taken along a line VII-VII in FIG. 6. FIG. 8 is a cross-sectional view taken along a line VIII-VIII in FIG. 6. FIG. 9 is an enlarged cross-sectional view illustrating a portion of the liquid ejecting head 10. Note that FIG. 6 is a diagram of the liquid ejecting head 10 viewed in the Z2 direction. Each of FIG. 7 and FIG. 8 is a diagram illustrating a cross section of the liquid ejecting head 10 orthogonal to the V-axis. FIG. 9 is a diagram for describing coupling between the flow path member 11 and the head chip 14, and illustrates a portion of the cross section taken along the line VIII-VIII in FIG. 6.

Prior to description of the separation member 18, first, the arrangement of the head chip 14, the wiring substrate 16, and the drive circuit 17 will be described below.

As illustrated in FIG. 6, the head chips 14-1, 14-2, 14-3, 14-4, 14-5, and 14-6 are aligned in this order in the X2 direction. Here, the head chips 14 are disposed parallel to each other in such a manner that the direction DN in which the nozzle rows Ln1 and Ln2 extend is inclined with respect to the direction DM that is a transport direction of the medium M. In addition, the head chip 14-1 and the head chip 14-2 are disposed in such a manner that positions thereof in the direction along the X-axis coincide with each other. Due to this, the head chip 14-1 is disposed at a position shifted in the Y1 direction with respect to the head chip 14-2. Similarly, the head chip 14-3 and the head chip 14-4 are disposed in such a manner that positions thereof in the direction along the X-axis coincide with each other. Thus, the head chip 14-3 is disposed at a position shifted in the Y1 direction with respect to the head chip 14-4. However, the head chip 14-3 is disposed at a position slightly shifted in the Y1 direction with respect to the head chip 14-1. In addition, the head chip 14-5 and the head chip 14-6 are disposed in such a manner that positions thereof in the direction along the X-axis coincide with each other. Due to this, the head chip 14-5 is disposed at a position shifted in the Y1 direction with respect to the head chip 14-6. However, the head chip 14-5 is disposed at a position slightly shifted in the Y1 direction with respect to the head chip 14-3.

The wiring hole 11*a* of the flow path member 11, the wiring hole 12*a* of the circuit substrate 12, and the wiring hole 13*a* of the holder 13 are disposed in such a manner as to overlap each head chip 14 described above when viewed in the direction along the Z-axis. Each of the wiring holes 11*a*, 12*a*, and 13*a* has a shape extending in the direction along the V-axis, that is, the direction DN in which the nozzle rows Ln1 and Ln2 of the head chips 14 extend. In this way, the wiring holes 11*a*, 12*a*, and 13*a* are provided for each head chip 14. Note that the shapes and the sizes of the wiring holes 11*a*, 12*a*, and 13*a* as viewed in the direction along the Z-axis are not limited to the example illustrated in FIG. 6 and are freely selected as long as the wiring substrate 16 can be passed therethrough.

As illustrated in FIG. 7, one end of the wiring substrate 16 is coupled to each head chip 14. That is, one end of the wiring substrate 16-1 is coupled to the head chip 14-1, one end of the wiring substrate 16-2 is coupled to the head chip 14-2, one end of the wiring substrate 16-3 is coupled to the head chip 14-3, one end of the wiring substrate 16-4 is coupled to the head chip 14-4, one end of the wiring substrate 16-5 is coupled to the head chip 14-5, and one end of the wiring substrate 16-6 is coupled to the head chip 14-6.

Each wiring substrate 16 passes from the head chip 14 through the wiring hole 13*a* of the holder 13, the wiring hole 11*a* of the flow path member 11, and the wiring hole 12*a* of the circuit substrate 12 in this order, thereby being routed on the surface of the circuit substrate 12 facing the Z1 direction. Additionally, the other end of each wiring substrate 16 is bonded to a terminal, which is not illustrated, provided on the surface of the circuit substrate 12 facing the Z1 direction by using a conductive bonding agent such as solder or a conductive adhesive.

Further, the drive circuit 17 is provided on one surface of each wiring substrate 16. The drive circuit 17 is positioned in the wiring hole 13*a* of the holder 13, and faces an inner wall surface of the wiring hole 13*a*. Note that the term "face" includes a case where two target members face each other with a sheet-shaped or film-shaped member such as the separation member 18 interposed therebetween, in addition to a case where two target members face each other in a state of being in contact with or separated from each other without another member interposed therebetween.

To be more specific, the drive circuit 17-1 is provided on a surface of the wiring substrate 16-1 facing the W1 direction, and faces an inner wall surface 13*c*-1 of the wiring hole 13*a* facing the W2 direction. The inner wall surface 13*c*-1 is an example of a "first inner wall surface". Thus, the inner wall surface 13*c*-1 is a surface facing the W2 direction that is a direction opposite to the W1 direction that the drive circuit 17-1 faces. On the other hand, the drive circuit 17-2 is provided on a surface of the wiring substrate 16-2 facing the W2 direction, and faces an inner wall surface 13*c*-2 of the wiring hole 13*a* facing the W1 direction. The inner wall surface 13*c*-2 is an example of a "second inner wall surface". As described above, the inner wall surface 13*c*-2 is a surface facing the W1 direction that is a direction opposite to the W2 direction that the drive circuit 17-2 faces.

Similarly, the drive circuit 17-3 is provided on a surface of the wiring substrate 16-3 facing the W1 direction, and faces an inner wall surface 13*c*-3 of the wiring hole 13*a* facing the W2 direction. On the other hand, the drive circuit 17-4 is provided on a surface of the wiring substrate 16-4 facing the W2 direction, and faces an inner wall surface 13*c*-4 of the wiring hole 13*a* facing the W1 direction. Additionally, the drive circuit 17-5 is provided on a surface of the wiring substrate 16-5 facing the W1 direction, and faces an inner wall surface 13*c*-5 of the wiring hole 13*a* facing the W2 direction. On the other hand, the drive circuit 17-6 is provided on a surface of the wiring substrate 16-6 facing the W2 direction, and faces an inner wall surface 13*c*-6 of the wiring hole 13*a* facing the W1 direction. Hereinafter, the inner wall surfaces 13*c*-1 to 13*c*-6 may be referred to as the inner wall surface 13*c* without distinction.

In the example illustrated in FIG. 7, the inner wall surfaces 13*c*-1 to 13*c*-6 are wall surfaces of the wiring holes 13*a* different from each other.

As described above, the holder 13 includes the inner wall surfaces 13*c*-1 to 13*c*-6 facing the drive circuits 17-1 to 17-6, respectively.

In addition, as illustrated in FIG. 8 and FIG. 9, each wiring hole 13*a* permits direct coupling between each of flow paths Pa1 and Pa2 of the flow path member 11 and the opening HL of the head chip 14. The flow path Pa1 is a flow path for the first ink, and the flow path Pa2 is a flow path for the second ink. FIG. 8 illustrates a coupling state between the head chip 14-1 and the flow path member 11. In the example illustrated in FIG. 8 and FIG. 9, the flow path member 11 includes a portion protruding in the Z2 direction in such a manner as to be inserted into the wiring hole 13*a* toward the head chip 14, and the flow paths Pa1 and Pa2 are opened at a tip (an end in the Z2 direction) of the portion. The tip of the portion is bonded to the head chip 14 in a liquid-tight manner by using an adhesive or the like, and thus each of the flow paths Pa1 and Pa2 communicates with the opening HL.

Here, as described above, the flow path member 11 is layered on the holder 13 and is made of a resin. As illustrated in FIG. 8 and FIG. 9, the holder 13 does not include a flow path through which liquid flows, the flow path communicating with the head chip 14-1. On the other hand, the flow path member 11 includes the flow paths Pa1 and Pa2 through which liquid flows, the flow paths communicating with the head chip 14-1. As a result, even when heat is released from the drive circuit 17 to the holder 13, heating of the liquid in the flow path member 11 due to the heat is reduced.

Static electricity may be generated at the holder 13 as described above. When the static electricity flows from the holder 13 to the drive circuit 17, the drive circuit 17 may fail.

More specifically, in the above-described transport mechanism 30, a transport roller pair pinches and transports the medium M such as paper. At this time, the medium M is positively charged by a series of operations of contact and friction with the transport rollers, and peel-off from the transport rollers. This increases a surface potential of the medium M. Such charging is a phenomenon in which two objects made of different materials are rubbed against each other and thus the two objects are charged with positive electricity and negative electricity, and is generally called frictional charging.

Here, when the drive circuit 17 and the holder 13 are not in contact with each other, the electricity due to the charging of the medium M flows from the medium M to the ground, which is not illustrated, after passing through the fixing plate 15 facing the medium M, the holder 13, and the support body 41 in this order. On the other hand, when the drive circuit 17 and the holder 13 are in direct contact with each other, there is a concern that the electricity due to the charging of the medium M flows from the medium M to the ground after passing through the fixing plate 15, the holder 13, and the drive circuit 17 in this order.

Withstand voltages of the insulating layers of electronic components constituting the drive circuit 17 are from about 80 V to 100 V. On the other hand, a voltage of the static electricity such as the frictional charging described above is from about 1 kV to 2 kV. Thus, when the static electricity flows into the drive circuit 17, insulation of the insulating layer is broken down due to the static electricity.

Note that since the nozzle plate 14*c* described above is made of silicon, the fixing plate 15 made of the metal is preferably coupled to the ground and thus breakdown of the drive circuit 17 due to flow of electricity through the nozzle plate 14*c* is suppressed. In this case, electricity due to charging of the medium M is easily transmitted to the holder 13 through the fixing plate 15. Additionally, even when the fixing plate 15 is made of an insulator such as resins, there is a possibility that static electricity directly flows from the medium M to the end of the holder 13 in the Z2 direction in the vicinity of the side surface.

As such, the liquid ejecting head 10 includes the separation members 18-1, 18-2, and 18-3, and thus the failure of the drive circuit 17 due to the static electricity is suppressed. As illustrated in FIG. 7, the separation member 18-1 is disposed between the inner wall surface 13*c*-1 and the drive circuit 17-1 and thus suppresses conduction between the inner wall surface 13*c*-1 and the drive circuit 17-1. Also, the separation member 18-1 is disposed between the inner wall surface 13*c*-2 and the drive circuit 17-2 and thus suppresses conduction between the inner wall surface 13*c*-2 and the drive circuit 17-2. The separation member 18-2 is disposed between the inner wall surface 13*c*-3 and the drive circuit 17-3 and thus suppresses conduction between the inner wall surface 13*c*-3 and the drive circuit 17-3. Also, the separation member 18-2 is disposed between the inner wall surface 13*c*-4 and the drive circuit 17-4 and thus suppresses conduction between the inner wall surface 13*c*-4 and the drive circuit 17-4. The separation member 18-3 is disposed between the inner wall surface 13*c*-5 and the drive circuit 17-5 and thus suppresses conduction between the inner wall surface 13*c*-5 and the drive circuit 17-5. Also, the separation member 18-3 is disposed between the inner wall surface 13*c*-6 and the drive circuit 17-6 and thus suppresses conduction between the inner wall surface 13*c*-6 and the drive circuit 17-6.

By using such separation members 18-1, 18-2, and 18-3, even when the static electricity is generated in the holder 13, flowing of the static electricity from the holder 13 into the drive circuit 17 is suppressed. This suppresses a failure of the drive circuit 17 caused by the static electricity.

Hereinafter, the separation member 18 will be described in detail. Note that the separation member 18-1 will be representatively described below, but the separation members 18-2 and 18-3 are configured in a manner similar to that of the separation member 18-1 except that the arrangement is different because the target drive circuits 17 are different. However, the separation members 18-1, 18-2, and 18-3 may have different configurations from each other. For example, the separation members 18-1, 18-2, and 18-3 may have different shapes, thicknesses, sizes, constituent materials, and the like from each other.

As illustrated in FIG. 7, the separation member 18-1 is provided in common to the head chip 14-1 and the head chip 14-2. Here, as described above, the head chip 14-1 and the head chip 14-2 are adjacent to each other in the direction along the W-axis. The drive circuit 17-1 is disposed on a surface of the wiring substrate 16-1 facing the W1 direction that is a direction from the head chip 14-1 toward the head chip 14-2. On the other hand, the drive circuit 17-2 is disposed on a surface of the wiring substrate 16-2 facing the W2 direction that is a direction from the head chip 14-2 toward the head chip 14-1. In this manner, the drive circuit 17-1 and the drive circuit 17-2 are disposed in such a manner as to face each other. Thus, there is an advantage that the separation member 18 can be easily shared by the head chip 14-1 and the head chip 14-2 adjacent to each other.

To be more specific, the separation member 18-1 includes a base portion 18*a*, a first portion 18*b*-1, and a second portion 18*b*-2.

The base portion 18*a* is a portion of the separation member 18-1 that has a sheet shape or film shape and whose thickness direction is the direction along the Z-axis, and is supported by other constituent elements of the liquid ejecting head 10. The base portion 18*a* according to the present embodiment is disposed between the flow path member 11 and the circuit substrate 12, and is fixed to both the flow path member 11 and the circuit substrate 12 by using an adhesive, screwing, or the like. Note that the base portion 18*a* may be simply held between the flow path member 11 and the circuit substrate 12, and does not need to be fixed to both the flow path member 11 and the circuit substrate 12 by using an adhesive, screwing, or the like. Here, a width of the base portion 18*a* in the direction along the W-axis is larger than a distance between two wiring holes 11*a* adjacent to each other. This causes each of the first portion 18*b*-1 and the second portion 18*b*-2 to be extended in the Z2 direction from a position separated from the flow path member 11. Note that depending on the shapes, rigidities, or the like of the first portion 18*b*-1 and the second portion 18*b*-2, the width of the base portion 18*a* in the direction along the W-axis may be equal to the distance between the two wiring holes 11*a* adjacent to each other.

The first portion 18*b*-1 is a portion of the separation member 18-1 extending substantially in the Z2 direction from the end of the base portion 18*a* in the W2 direction, and is interposed between the inner wall surface 13*c*-1 and the drive circuit 17-1. As described above, the first portion 18*b*-1 is bent at one end of the base portion 18*a*, and thus is disposed between the inner wall surface 13*c*-1 and the drive circuit 17-1. In the example illustrated in FIG. 7, one surface of the first portion 18*b*-1 is in contact with the inner wall surface 13*c*-1, and the other surface of the first portion 18*b*-1 is in contact with the drive circuit 17-1.

The second portion 18*b*-2 is a portion of the separation member 18-1 extending substantially in the Z2 direction from the end of the base portion 18*a* in the W1 direction, and is interposed between the inner wall surface 13*c*-2 and the drive circuit 17-2. In this manner, the second portion 18*b*-2 is bent at the other end of the base portion 18*a*, and thus is disposed between the inner wall surface 13*c*-2 and the drive circuit 17-2. In the example illustrated in FIG. 7, one surface of the second portion 18*b*-2 is in contact with the inner wall surface 13*c*-2, and the other surface of the second portion 18*b*-2 is in contact with the drive circuit 17-2.

Since the separation member 18-1 includes the base portion 18*a*, the first portion 18*b*-1, and the second portion 18*b*-2 as described above, the separation member 18 has a U-shape when viewed along the V-axis, and the separation member 18-1 is shared by the head chip 14-1 and the head chip 14-2 adjacent to each other. This can reduce the number of components, compared to an aspect in which individual separation members are used in the head chip 14-1 and the head chip 14-2.

In the present embodiment, as described above, since the one surface of the first portion 18*b*-1 is in contact with the inner wall surface 13*c*-1 and the other surface of the first portion 18*b*-1 is in contact with the drive circuit 17-1, the separation member 18 is in contact with both the drive circuit 17-1 and the inner wall surface 13*c*-1 between the drive circuit 17-1 and the inner wall surface 13*c*-1. Similarly, since the one surface of the second portion 18*b*-2 is in contact with the inner wall surface 13*c*-2 and the other surface of the second portion 18*b*-2 is in contact with the drive circuit 17-2, the separation member 18 is in contact with both the drive circuit 17-2 and the inner wall surface 13*c*-2 between the drive circuit 17-2 and the inner wall surface 13*c*-2.

In this way, the separation member 18-1 is held between the drive circuit 17-1 and the inner wall surface 13*c*-1. This causes heat of the drive circuit 17-1 to be efficiently released to the holder 13 through the separation member 18-1 due to heat conduction by using the separation member 18-1. Similarly, the separation member 18-1 is held between the drive circuit 17-2 and the inner wall surface 13*c*-2. This causes heat of the drive circuit 17-2 to be efficiently released to the holder 13 through the separation member 18-1 due to heat conduction by using the separation member 18-1. Since the holder 13 is made of a metal, heat is easily radiated to the outside of the liquid ejecting head 10.

Here, reducing the thickness of the separation member 18 can enhance efficiency of releasing the heat of the drive circuit 17 to the holder 13 through the separation member 18. In addition, even when the separation member 18 is in contact with both the drive circuit 17 and the inner wall surface 13*c*, since the separation member 18 is made of an insulator, flowing of the static electricity, generated in the holder 13, from the holder 13 into the drive circuit 17 is suitably suppressed.

Since the drive circuit 17 includes the switching elements provided corresponding to the piezoelectric elements 14*f* as described above, the drive circuit 17 is likely to generate heat due to a switching operation, and thus a failure such as a malfunction may occur due to an excessive temperature rise. For this reason, as described above, efficiently releasing the heat of the drive circuit 17 to the holder is effective in ensuring a stable operation of the drive circuit 17.

In the present embodiment, as described above, since the separation member 18 is in contact with the holder 13, the separation member 18 is made of an insulator. Thus, since the inner wall surface 13*c* and the drive circuit 17 are electrically insulated from each other by the separation member 18, flowing of the static electricity, generated in the holder 13, from the holder 13 into the drive circuit 17 is suitably suppressed.

The material constituting the insulator to be used for the separation member 18 is not particularly limited, and examples thereof include resin materials such as PET, PP, and PVC, glass, and insulating ceramics. Further, the insulator may be paper made of fibers such as pulp. Here, the material constituting the insulator to be used for the separation member 18 is preferably a resin. Since the insulator to be used for the separation member 18 is constituted of a resin, the separation member 18 can be easily molded and is suitable for mass production, compared with an aspect in which the insulator is constituted of an insulating ceramic or the like, resulting in achieving cost reduction.

The separation member 18 has a sheet shape or film shape. For this reason, even when an accommodation space of the wiring substrate 16 in the liquid ejecting head 10 is narrow, the separation member 18 can be easily disposed. The expression "sheet shape or film shape" as used herein means that the film has a thickness equal to or less than 1 mm, preferably has a thickness equal to or less than 0.2 mm, and more preferably has a thickness equal to or less than 0.1 mm. That is, the thickness of the separation member 18 is not particularly limited as long as the separation member 18 can be interposed between the drive circuit 17 and the inner wall surface 13*c*, but is preferably equal to or less than 1 mm, more preferably equal to or less than 0.2 mm, and still more preferably equal to or less than 0.1 mm.

The separation member 18 preferably has shape retainability. The term "shape retainability" refers to a property of a sheet-shaped or film-shaped member by which the member is bent back at an angle being less than 10° (preferably less than 5°) after being bent at an angle of 90°. Since the separation member 18 has the shape retainability as described above, when the separation member 18 is inserted between the drive circuit 17 and the inner wall surface 13*c*, difficulty in insertion due to bending of the separation member 18 is reduced. This can improve a handling property of the separation member 18 at the time of assembling the liquid ejecting head 10.

As described above, by using the separation member 18, a failure of the drive circuit 17 due to static electricity can be suppressed.

2. Second Embodiment

Hereinafter, a second embodiment of the present disclosure will be described. In the embodiment, which will be exemplified below, elements having operations and functions similar to those in the first embodiment are denoted by the same reference signs as those used in the description of the first embodiment, and detailed description thereof will be appropriately omitted.

Figure 10:
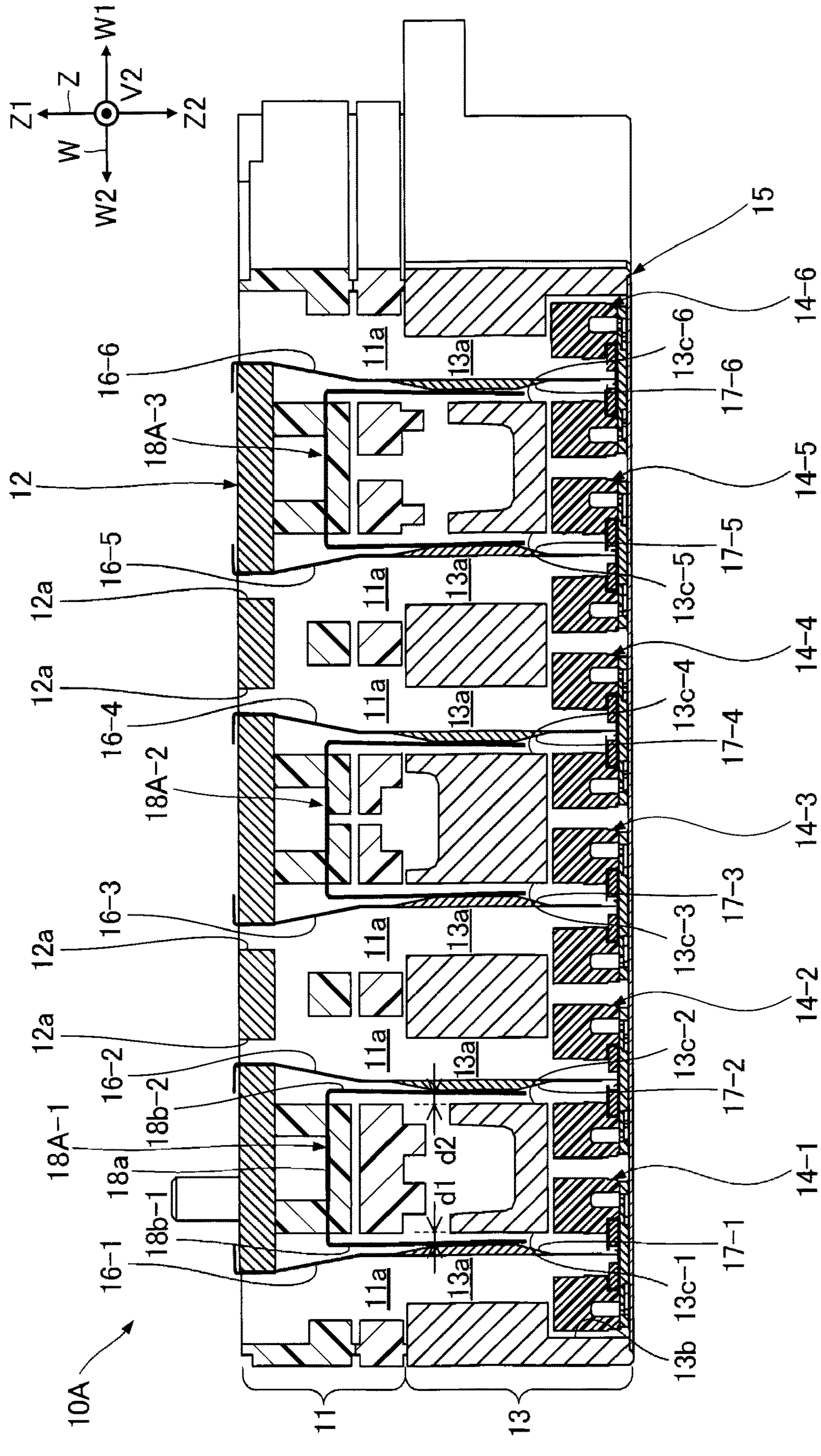
FIG. 10 is a cross-sectional view of a liquid ejecting head according to a second embodiment.

FIG. 10 is a cross-sectional view of a liquid ejecting head 10A according to the second embodiment. The liquid ejecting head 10A is configured in a manner similar to that of the liquid ejecting head 10 according to the first embodiment described above except that the liquid ejecting head 10A includes separation members 18A-1 to 18A-3 instead of the separation members 18-1 to 18-3.

Hereinafter, the separation members 18A-1 to 18A-3 may be referred to as a separation member 18A without being distinguished from each other.

The separation member 18A is similarly configured as with the separation member 18 according to the first embodiment except that the separation member 18A has a rigidity higher than that of the separation member 18 according to the first embodiment.

In this manner, the separation member 18A-1 biases the drive circuit 17-1 in a direction that the inner wall surface 13*c*-1 faces in such a manner as to form a gap d1 between the separation member 18A-1 and the inner wall surface 13*c*-1. Here, in the separation member 18A-1, one surface of the first portion 18*b*-1 is not in contact with the inner wall surface 13*c*-1, and the other surface of the first portion 18*b*-1 is in contact with the drive circuit 17-1, which forms the gap d1. Thus, since the gap d1 functions as an insulator, flowing of static electricity, generated in the holder 13, from the holder 13 into the drive circuit 17-1 is suitably suppressed. Note that the biasing force is, for example, a spring elastic force of the separation member 18A.

On the other hand, the separation member 18A-1 biases the drive circuit 17-2 in a direction that the inner wall surface 13*c*-2 faces in such a manner as to form a gap d2 between the separation member 18A-1 and the inner wall surface 13*c*-2. Here, in the separation member 18A-1, one surface of the second portion 18*b*-2 is not in contact with the inner wall surface 13*c*-2, and the other surface of the second portion 18*b*-2 is in contact with the drive circuit 17-2, which forms the gap d2. Thus, since the gap d2 functions as an insulator, flowing of static electricity, generated in the holder 13, from the holder 13 into the drive circuit 17-2 is suitably suppressed. In this manner, the separation member 18A-1 biases the drive circuits 17-1 and 17-2 in directions away from each other in such a manner as to form the gaps between the separation member 18A-1 and each of the inner wall surfaces 13*c*-1 and 13*c*-2.

Similarly, the separation member 18A-2 biases the drive circuits 17-3 and 17-4 in directions away from each other in such a manner as to form gaps between the separation member 18A-2 and each of the inner wall surfaces 13*c*-3 and 13*c*-4. Also, the separation member 18A-3 biases the drive circuits 17-5 and 17-6 in directions away from each other in such a manner as to form gaps between the separation member 18A-3 and each of the inner wall surfaces 13*c*-5 and 13*c*-6.

In the present embodiment, as in the first embodiment, the flow path member 11 is layered on the holder 13 and is made of a resin. In addition, the holder 13 does not include a flow path through which liquid flows, the flow path communicating with the head chip 14-1, whereas the flow path member 11 includes the flow paths Pa1 and Pa2 through which liquid flows, the flow paths communicating with the head chip 14. Then, the separation member 18A is supported by the flow path member 11. To be specific, as illustrated in FIG. 10, the base portion 18*a* is mounted on a surface different from a surface of the flow path member 11 on which the circuit substrate 12 is mounted, and thus the separation member 18A is supported by the flow path member 11. Here, the separation member 18A may be a conductor. In this case, even when the thickness of the separation member 18A is reduced, the rigidity of the separation member 18A can be enhanced as compared with an aspect in which the separation member 18A is made of a resin. Thus, gaps such as the gaps d1 and d2 described above can be easily formed. Here, since the separation member 18A is supported by the flow path member 11 made of a resin and having an insulating property, even when the separation member 18A is a conductor, conduction between the drive circuit 17-1 and other members through the flow path member 11 is suppressed.

Examples of a material constituting the conductor to be used as the separation member 18A include metals and conductive ceramics. The metal is not particularly limited, and examples thereof include iron, aluminum, and copper, and alloys thereof.

Note that the separation member 18A may be an insulator. When the separation member 18A is an insulator, the inner wall surface 13*c*-1 and the drive circuit 17-1 are electrically insulated from each other by the separation member 18A. Accordingly, flowing of the static electricity, generated in the holder 13, from the holder 13 into the drive circuit 17 is suitably suppressed in combination with the electrical insulation by the gap d1 described above.

According to the second embodiment described above, a failure of the drive circuit 17 due to the static electricity can be suppressed.

3. Modifications

The embodiments exemplified above can be modified in various ways. Specific modifications that can be applied to the above-described embodiments will be exemplified below. Two or more aspects freely selected from the following examples can be appropriately combined within a range in which the two or more aspects do not contradict each other.

3-1. Modification 1

In each of the above-described embodiments, the aspect in which the separation member 18 or 18A is shared by the two head chips 14 has been exemplified, but the present disclosure is not limited to this aspect, and each of the separation members 18 and 18A may be constituted by an individual member for each head chip 14.

3-2. Modification 2

In each of the embodiments described above, the aspect in which the base portion 18*a* of the separation member 18 or 18A is disposed between the flow path member 11 and the circuit substrate 12 has been exemplified, but the present disclosure is not limited to this aspect, and for example, the base portion 18*a* may be fixed to the surface of the circuit substrate 12 facing the Z1 direction, or may be disposed between the flow path member 11 and the holder 13. In addition, when the separation member 18 or 18A is an insulator, the base portion 18*a* may be constituted integrally with the circuit substrate 12 or the flow path member 11. The base portion 18*a* is provided as necessary, and may be omitted. In this case, for example, each of the first portion 18*b*-1 and the second portion 18*b*-2 is supported by another constituent element of the liquid ejecting head 10.

3-3. Modification 3

In each of the above-described embodiments, the aspect in which each of the first portion 18*b*-1 and the second portion 18*b*-2 extends from the base portion 18*a* in the Z2 direction has been exemplified, but the present disclosure is not limited to this aspect, and for example, the base portion 18*a* may be disposed between the head chip 14 and the holder 13, and each of the first portion 18*b*-1 and the second portion 18*b*-2 may extend from the base portion 18*a* in the Z1 direction.

3-4. Modification 4

In each of the above-described embodiments, the aspect in which the liquid ejecting head 10 or 10A is used as a line head has been exemplified. However, the present disclosure is not limited to this aspect, and the liquid ejecting head 10 or 10A may be used as a carriage serial type head that is reciprocated in the width direction of the medium M. In this case, at least one liquid ejecting head 10 is mounted on a carriage that is reciprocated in the width direction of the medium M.

3-5. Modification 5

In each of the above-described embodiments, the aspect in which the circulation mechanism 50 is used has been exemplified, but the present disclosure is not limited to this aspect, and the circulation mechanism 50 may be omitted.

3-6. Modification 6

The liquid ejecting apparatus 100 exemplified in each of the above-described embodiments can be employed in various apparatuses such as facsimile apparatuses and copy machines in addition to apparatuses dedicated to printing. However, the use of the liquid ejecting apparatus according to the present disclosure is not limited to printing. For example, a liquid ejecting apparatus that discharges a solution of a color material is used as a manufacturing apparatus that forms a color filter of a liquid crystal display apparatus. In addition, a liquid ejecting apparatus that discharges a solution of a conductive material is used as a manufacturing apparatus that forms wiring lines or electrodes of a wiring substrate.

4. Supplementary Notes

A summary of the present disclosure will be provided below as supplementary notes.

Supplementary Note 1

A liquid ejecting head according to a first aspect of the present disclosure includes a first head chip including a plurality of nozzles configured to eject liquid, a first wiring substrate including a first drive circuit, the first drive circuit being electrically coupled to the first head chip, a fixing plate including a first exposure opening portion configured to expose the plurality of nozzles of the first head chip, the fixing plate being fixed with the first head chip, a holder including a first inner wall surface facing the first drive circuit, the holder being made of a metal, the holder being configured to hold the first head chip between the fixing plate and the holder, and a separation member disposed between the first inner wall surface and the first drive circuit, the separation member being configured to suppress conduction between the first inner wall surface and the first drive circuit.

In the first aspect described above, since the separation member is disposed between the first inner wall surface and the first drive circuit and thus conduction between the first inner wall surface and the first drive circuit is suppressed, even when static electricity is generated in the holder, flowing of the static electricity from the holder into the first drive circuit is suppressed. This suppresses a failure of the first drive circuit due to the static electricity. The term "facing" includes a case where two target members face each other with a sheet-shaped or film-shaped member such as a separation member interposed therebetween, in addition to a case where two target members face each other in a state of being in contact with or separated from each other without another member interposed therebetween.

Supplementary Note 2

In a second aspect that is a preferred example of the first aspect, the separation member is an insulator. In the second aspect described above, since the first inner wall surface and the first drive circuit are insulated from each other, flowing of static electricity, generated in the holder, from the holder into the first drive circuit is suitably suppressed.

Supplementary Note 3

In a third aspect that is a preferred example of the second aspect, the separation member has a sheet shape or a film shape. In the third aspect described above, even when an accommodation space of the first wiring substrate is narrow, the separation member can be easily disposed. Here, the term "a sheet shape or a film shape" refers to a sheet shape or a film shape having a thickness equal to or less than 1 mm, preferably equal to or less than 0.2 mm, and more preferably equal to or less than 0.1 mm.

Supplementary Note 4

In a fourth aspect that is a preferred example of the third aspect, the separation member is interposed between the first drive circuit and the first inner wall surface. In the fourth aspect described above, heat of the first drive circuit can be efficiently released to the holder through the separation member. Here, reducing the thickness of the separation member can enhance the efficiency of releasing the heat of the first drive circuit to the holder through the separation member. In addition, even when the separation member is in contact with each of the first drive circuit and the first inner wall surface, when the separation member is an insulator, flowing of the static electricity, generated in the holder, from the holder into the first drive circuit is suitably suppressed.

Supplementary Note 5

The liquid ejecting head according to a fifth aspect that is a preferred example of the fourth aspect, further includes a flow path member layered on the holder, the flow path member being made of a resin, and in the fifth aspect, the holder does not include a flow path through which liquid flows, the flow path communicating with the first head chip, and the flow path member includes a flow path through which liquid flows, the flow path communicating with the first head chip. In the fifth aspect described above, even when heat is released from the first drive circuit to the holder, heating of the liquid in the flow path member due to the heat is reduced.

Supplementary Note 6

In a sixth aspect that is a preferred example of the third aspect, the separation member has shape retainability. In the sixth aspect described above, when the separation member is inserted between the first drive circuit and the first inner wall surface, difficulty in insertion due to bending of the separation member is reduced. This can improve a handling property of the separation member at the time of assembling the liquid ejecting head. Here, the term "shape retainability" refers to a property of a sheet-shaped or film-shaped member by which the member is bent back at an angle being less than 10° (preferably less than 5°) after being bent at an angle of 90°.

Supplementary Note 7

In a seventh aspect that is a preferred example of the second aspect, the separation member has shape retainability. In the seventh aspect described above, when the separation member is inserted between the first drive circuit and the first inner wall surface, difficulty in insertion due to bending of the separation member is reduced. This can improve a handling property of the separation member at the time of assembling the liquid ejecting head.

Supplementary Note 8

In an eighth aspect that is a preferred example of the second aspect, the insulator is made of a resin. In the above-described eighth aspect, compared to an aspect in which the insulator is an insulating ceramic or the like, the separation member is easily molded and is suitable for mass production, resulting in achieving cost reduction.

Supplementary Note 9

In a ninth aspect that is a preferred example of the first aspect, the separation member biases the first drive circuit in a direction that the first inner wall surface faces so as to form a gap between the separation member and the first inner wall surface. In the ninth aspect described above, since the gap functions as an insulator, flowing of static electricity, generated in the holder, from the holder into the first drive circuit is suitably suppressed.

Supplementary Note 10

The liquid ejecting head according to a tenth aspect that is a preferred example of the ninth aspect, further includes a flow path member layered on the holder, the flow path member being made of a resin, in the tenth aspect, the holder does not include a flow path through which liquid flows, the flow path communicating with the first head chip, the flow path member includes a flow path through which liquid flows, the flow path communicating with the first head chip, and the separation member is a conductor, and is supported by the flow path member. In the tenth aspect described above, even when the separation member is made thin, rigidity of the separation member can be enhanced, compared with the aspect in which the separation member is made of the resin. Thus, the gap can be easily formed. Here, since the separation member is supported by the flow path member made of the resin and having the insulating property, even when the separation member is the conductor, conduction between the first drive circuit and other members through the flow path member is suppressed.

Supplementary Note 11

In an eleventh aspect that is a preferred example of the ninth aspect, the separation member is an insulator. In the eleventh aspect described above, since the first inner wall surface and the first drive circuit are insulated from each other, flowing of static electricity, generated in the holder, from the holder into the first drive circuit is suitably suppressed.

Supplementary Note 12

The liquid ejecting head according to a twelfth aspect that is a preferred example of the first aspect, further includes a second head chip including a plurality of nozzles configured to eject liquid, the second head chip being held between the fixing plate and the holder, and a second wiring substrate including a second drive circuit, the second wiring substrate being electrically coupled to the second head chip, the fixing plate includes a second exposure opening portion configured to expose the plurality of nozzles of the second head chip, the holder includes a second inner wall surface facing the second drive circuit, the first head chip and the second head chip are adjacent to each other, the first drive circuit is disposed on a surface facing a direction from the first head chip toward the second head chip among surfaces of the first wiring substrate, and the second drive circuit is disposed on a surface facing a direction from the second head chip toward the first head chip among surfaces of the second wiring substrate. In the twelfth aspect described above, since the first drive circuit and the second drive circuit are disposed in such a manner as to face each other, there is an advantage that the separation member is easily shared by the first head chip and the second head chip that are adjacent to each other.

Supplementary Note 13

In a thirteenth aspect that is a preferred example of the twelfth aspect, the separation member includes a base portion, a first portion bent at one end of the base portion, the first portion being disposed between the first inner wall surface and the first drive circuit due to being bent, and a second portion bent at the other end of the base portion, the second portion being disposed between the second inner wall surface and the second drive circuit by being bent. In the thirteenth aspect, since the separation member is shared by the first head chip and the second head chip that are adjacent to each other, the number of components can be reduced, compared to an aspect in which an individual separation member is used for each of the first head chip and the second head chip.

Supplementary Note 14

In a fourteenth aspect that is a preferred example of the first aspect, the fixing plate is made of a metal. In the fourteenth aspect described above, even when static electricity is generated at the fixing plate, flowing of the static electricity from the fixing plate into the first drive circuit through the holder is suppressed.

Supplementary Note 15

A liquid ejecting apparatus according to a fourteenth aspect that is a preferred example of the present disclosure includes the liquid ejecting head according to any one of the first aspect to the fourteenth aspect, and a liquid storage portion configured to supply the liquid to the liquid ejecting head. According to the fourteenth aspect, the liquid ejecting apparatus having excellent reliability can be provided.

What is claimed is:

1. A liquid ejecting head comprising:

a first head chip including nozzles configured to eject liquid;

a first wiring substrate including a first drive circuit, the first wiring substrate being electrically coupled to the first head chip;

a fixing plate including a first exposure opening portion configured to expose the nozzles of the first head chip, the fixing plate being fixed with the first head chip;

a holder including a first inner wall surface facing the first drive circuit, the holder being made of a metal, the holder being configured to hold the first head chip between the holder and the fixing plate; and a separation member disposed between the first inner wall surface and the first drive circuit, the separation member being configured to suppress conduction between the first inner wall surface and the first drive circuit.

2. The liquid ejecting head according to claim 1, wherein the separation member is an insulator.

3. The liquid ejecting head according to claim 2, wherein the separation member has a sheet shape or a film shape.

4. The liquid ejecting head according to claim 3, wherein the separation member is held between the first drive circuit and the first inner wall surface.

5. The liquid ejecting head according to claim 4, further comprising:

a flow path member layered on the holder, the flow path member being made of a resin, wherein the holder does not include a flow path through which liquid flows, the flow path communicating with the first head chip, and the flow path member includes a flow path through which liquid flows, the flow path communicating with the first head chip.

6. The liquid ejecting head according to claim 3, wherein the separation member has shape retainability.

7. The liquid ejecting head according to claim 2, wherein the separation member has shape retainability.

8. The liquid ejecting head according to claim 2, wherein the insulator is made of a resin.

9. The liquid ejecting head according to claim 1, wherein the separation member biases the first drive circuit in a direction that the first inner wall surface faces so as to form a gap between the separation member and the first inner wall surface.

10. The liquid ejecting head according to claim 9, further comprising:

a flow path member layered on the holder, the flow path member being made of a resin, wherein the holder does not include a flow path through which liquid flows, the flow path communicating with the first head chip, the flow path member includes a flow path through which liquid flows, the flow path communicating with the first head chip, and the separation member is a conductor, and is supported by the flow path member.

11. The liquid ejecting head according to claim 9, wherein the separation member is an insulator.

12. The liquid ejecting head according to claim 1, further comprising:

a second head chip including nozzles configured to eject liquid, the second head chip being held between the fixing plate and the holder; and a second wiring substrate including a second drive circuit, the second wiring substrate being electrically coupled to the second head chip, wherein the fixing plate includes a second exposure opening portion configured to expose the nozzles of the second head chip, the holder includes a second inner wall surface facing the second drive circuit, the first head chip and the second head chip are adjacent to each other, the first drive circuit is disposed on a surface facing a direction from the first head chip toward the second head chip among surfaces of the first wiring substrate, and the second drive circuit is disposed on a surface facing a direction from the second head chip toward the first head chip among surfaces of the second wiring substrate.

13. The liquid ejecting head according to claim 12, wherein the separation member includes a base portion, a first portion bent at one end of the base portion, the first portion being disposed between the first inner wall surface and the first drive circuit by being bent, and a second portion bent at an other end of the base portion, the second portion being disposed between the second inner wall surface and the second drive circuit by being bent.

14. The liquid ejecting head according to claim 1, wherein the fixing plate is made of a metal.

15. A liquid ejecting apparatus comprising:

the liquid ejecting head according to claim 1; and a liquid storage portion configured to supply the liquid to the liquid ejecting head.

* * * * *